(12) United States Patent
Kim et al.

(10) Patent No.: US 6,570,698 B2
(45) Date of Patent: May 27, 2003

(54) APPARATUS AND METHOD FOR MODULATING OPTICAL INTENSITY WITH AMPLITUDE NOISE SUPPRESSED BY USING LINEAR OPTICAL MODULATOR

(75) Inventors: Bong-Kyu Kim, Taejon (KR); Kwang-Joon Kim, Taejon (KR); Jong-Hyun Lee, Taejon (KR); Seung-Il Myong, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 37 days.

(21) Appl. No.: 09/750,072

(22) Filed: Dec. 29, 2000

(65) Prior Publication Data

US 2002/0051274 A1 May 2, 2002

(30) Foreign Application Priority Data

Nov. 1, 2000 (KR) .............................. 00-64731

(51) Int. Cl.[7] .............................. G02F 1/01; G02F 1/07; G02B 26/00
(52) U.S. Cl. ..................... 359/239; 359/237; 359/238; 359/259
(58) Field of Search ................. 359/237, 238, 359/239, 246, 259, 111, 161, 180, 181, 188

(56) References Cited

U.S. PATENT DOCUMENTS

| 5,161,044 A | 11/1992 | Nazarathy et al. ........... 359/157 |
| 5,293,545 A | * 3/1994 | Huber ........................ 359/111 |
| 5,532,867 A | 7/1996 | Hayes et al. ................. 359/329 |
| 5,726,794 A | 3/1998 | Tajima ........................ 359/249 |
| 6,046,838 A | 4/2000 | Kou et al. ................... 359/245 |

FOREIGN PATENT DOCUMENTS

| KR | 0162755 | 4/1999 | ............. G02B/6/35 |
| KR | 0264533 | 9/2000 | ............. G02F/1/00 |

* cited by examiner

*Primary Examiner*—Georgia Epps
*Assistant Examiner*—Timothy Thompson
(74) *Attorney, Agent, or Firm*—Jacobson Holman PLLC

(57) ABSTRACT

An apparatus and a method for modulating the optical intensity, with the noises suppressed by using a linear optical modulator, are disclosed, so that the characteristics of signals transmitted from an optical communication system can be improved, and that the resolution of the measured physical quantities can be improved in an optical measuring instrument. The method is carried out in the following manner. That is, the magnitude of frequency is measured by utilizing pilot signals and electrical signals to transfer negatively fed-back signals to an optical intensity modulator. The phase is delayed by generating pilot signals so as to suppress an amplitude noise from the pilot signal caused by nonlinear modulation at the optical intensity modulator. A linear modulation is carried out on the phase-delayed signals and on optical signals from an external source to provide a linear component. The bias voltage is adjusted in accordance with the negatively fed-back signals, and an optical intensity modulation is carried out on the linearly modulated signals and on the added signals, the added signals having been formed by combining the data signals and the pilot signals.

7 Claims, 3 Drawing Sheets

APPARATUS AND METHOD FOR MODULATING OPTICAL INTENSITY WITH AMPLITUDE NOISE SUPPRESSED BY USING LINEAR OPTICAL MODULATOR

FIELD OF THE INVENTION

The present invention relates to an apparatus and a method for modulating the optical intensity with a noise suppressed by using a linear optical modulator; and more Particularly, to an apparatus and a method for modulating the optical intensity a noise suppressed by using a linear optical modulator, in which, in a method for adjusting the bias voltage of an optical modulator by using the pilot signals, the noises due to the pilot signals are suppressed, so that the characteristics of signals transmitted from an optical communication system can be improved, and that the resolution of the measured physical quantities can be improved in an optical measuring instrument.

DESCRIPTION OF THE PRIOR ART

An optical intensity modulator is usefully applied not only to the optical communication field but also to the other optical technology including the optical measurements. Further, the optical intensity modulator necessarily uses the bias voltage adjusting method to improve the performance in the measurement and in the optical communication. The method in this connection is divided into: a method of measuring the optical intensity to adjust the bias voltage; and a method of using the pilot signals to adjust the bias voltage.

The method of measuring the optical intensity to adjust the bias voltage has a simple signal processing structure, and is very sensitive to external influences. Therefore, this method is widely adopted for measuring the external physical quantities.

In contrast to this, the method of utilizing the pilot signals to adjust the bias voltage is not sensitive to the external influences, and therefore, the method is widely adopted in the optical communication system which requires a stable operation. This will be described referring to FIG. 1. FIG. 1 illustrates the conventional optical intensity modulator using the pilot signals.

As shown in FIG. 1, in this conventional method for adjusting the bias voltage of the optical intensity modulator, first, the signals which are constant in the optical intensity are inputted into an optical intensity modulator 11. Then the main signals which are to be transmitted are mixed together with electrical signals which have passed through a pilot signal generator 12 for adjusting the bias voltage. Then these mixed signals are supplied to the optical intensity modulator 11.

Under this condition, the optical output signals of the optical intensity modulator consist of the main signals and the pilot signals to form the signals in which the optical intensity has been modulated. That is, they include data signals and pilot signals of, i.e., dc (direct current), fo, 2fo, 3fo . . .

That is, the optical signals which are outputted from the optical intensity modulator 11 include: dc, fo, 2fo, . . . , and data signals. However, the necessary components are the dc and data components, and therefore, the fo, 2fo, . . . components are noises.

Meanwhile, a part of the output optical signals of the optical intensity modulator 11 becomes monitoring signals to be transferred to a photo detector 14 which outputs electrical signals. Under this condition, signals which are same as the output signals of the optical intensity modulator 11 are also transferred to the photo detector 14, but they are different only in the optical intensity.

Thereafter, the magnitude of the 2fo component is measured by a negative feedback part 15 by utilizing the 2fo component of the pilot signals and the dc, fo, 2fo, . . . data components of the photo detector 14. The negative feedback circuit 15 includes a phase detector and a multiplier. If the value of the 2fo component which has been measured by the negative feedback circuit 15 is not zero, the level of the bias voltage is varied until the 2fo component becomes 0.

Now the conventional optical intensity modulator constituted as above will be described as to its bias voltage adjusting method.

The conversion of the electrical information signals to optical signals is carried out by the optical intensity modulator 11. Under this condition, if the phase difference of the optical intensity modulator 11 is not exactly 90 degrees, then the extinction ratio of the ON/OFF signals is aggravated, resulting in that noises are generated. Accordingly, in order to realize a phase difference of 90 degrees, the pilot signals of the frequency fo are supplied to the optical intensity modulator 11, thereby adjusting the bias voltage.

Thereafter, the beams which have been modulated by the pilot signals pass through an optical splitter to be detected by the photo detector 12. Thus the frequencies which correspond to integer-multiples of fo are detected. Under this condition, if the 2fo components are made to be 0 by using the negative feedback circuit 13, then the phase difference becomes 90 degrees.

However, the pilot signals other than the main signals (electrical information signals) modulate the optical signals, and therefore, the pilot signals themselves act as the noises, thereby generating noises. Accordingly, in this method using the pilot signals, the magnitude of the pilot signals has to be maintained at the minimum, but according as the magnitude of the pilot signals is reduced, the magnitude of the detected signals of the photo detector 12 becomes smaller, with the result that it becomes difficult to adjust the phase difference of the optical intensity modulator 11. Further, the 2fo component which is detected by the photo detector 12 is very much smaller than the fo component, and therefore, the magnitude of the pilot signals which are supplied to the photo detector 12 can be a serious problem.

SUMMARY OF THE INVENTION

The present invention is intended to overcome the above described disadvantages of the conventional techniques.

Therefore it is an object of the present invention to provide an apparatus and a method for modulating the optical intensity, with the noises suppressed by using a linear optical modulator, in which in a method for adjusting the bias voltage of an optical modulator by using the pilot signals, the input optical intensity is modulated by using a linear optical modulator, so that the error-inducing signal components are offset while maintaining the signal component for adjusting the bias voltage, thereby inhibiting the amplitude noises caused by the pilot signals.

In achieving the above object, the apparatus for modulating an optical intensity with amplitude noises suppressed by using a linear optical modulator according to the present invention includes: a pilot signal generating means for generating pilot signals so as to adjust a bias voltage; a phase delaying means for delaying the phase of the pilot signals after their generation by the pilot signal generating means; a linear optical modulating means for modulating optical signals from an external source by the phase-delayed signal; a signal adding means for adding together data information signals and the pilot signals from the pilot signal generating means; an optical intensity modulating means for modulating the linearly modulated signals from the linear optical modulating means to modulate the optical intensity by the added electrical signals from the signal adder and adjusting the bias voltage by negative feedback signals; a photo detecting means for detecting output signals of the optical intensity modulating means to convert them to electrical signals; and an amplitude measuring of a frequency component means for receiving the electrical signals from the optical detecting means and the pilot signals from the pilot signal generating means to measure the amplitude of the frequency component so as to generate negatively fed-back signals and so as to transfer them to the optical intensity modulating means.

In another aspect of the present invention, the method for modulating an optical intensity with amplitude noises suppressed by using a linear optical modulator according to the present invention includes the steps of: generating the pilot signal in order to adjust the bias voltage and applying the added signal to the optical intensity modulator, the added signals having been formed by combining the data signals and the pilot signals (first step); measuring the amplitude of the second harmonic frequency component from partly detected signals from among output signal and measured electrical signals to transfer negatively feed-back signals to an optical intensity modulator, the electrical signals having been converted from partly detected signals from among output signals, and then adjusting the bias voltage(second step); delaying the phase by generating pilot signals and modulating the optical signals from an external source to provide a linear component by delayed pilot signal, and suppressing the amplitude noise from the pilot signal (third step).

BRIEF DESCRIPTION OF THE DRAWINGS

The above object and other advantages of the present invention will become more apparent by describing in detail the preferred embodiment of the present invention with reference to the attached drawings in which.

DETAILED DESCRIPTION OF THE PREFERRED EMBODIMENTS

The preferred embodiments of the present invention will be described referring to the attached drawings.

Figure 2:
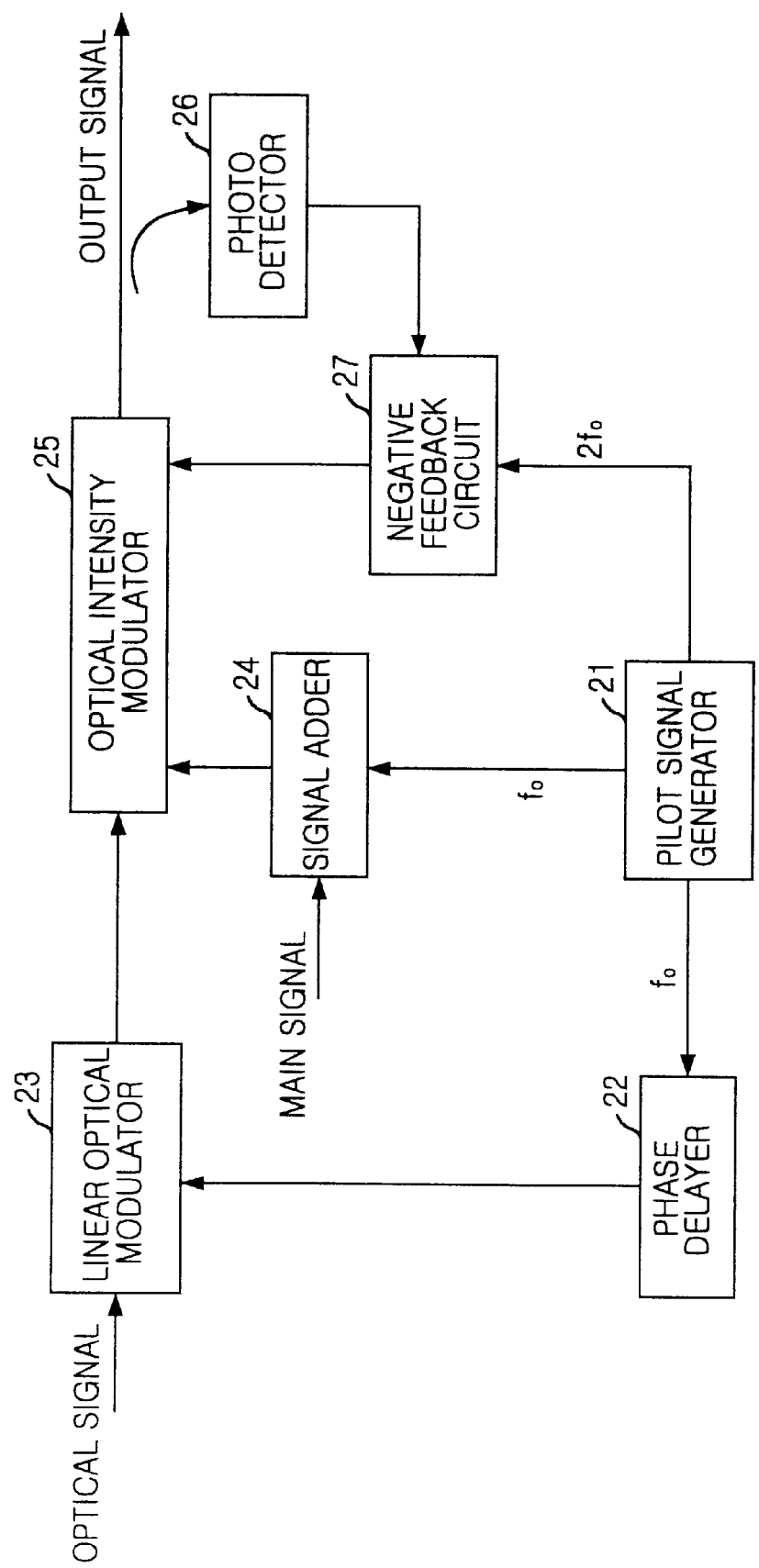
FIG. 2 illustrates a preferred embodiment of the apparatus and method for modulating the optical intensity with the noise suppressed by using the linear optical modulator according to the present invention.

FIG. 2 illustrates a preferred embodiment of the apparatus and method for modulating the optical intensity with the noise suppressed by using the linear optical modulator according to the present invention.

As shown in FIG. 2, the apparatus for modulating an optical intensity with amplitude noises suppressed by using a linear optical modulator according to the present invention includes: a pilot signal generator 21 for generating pilot signals as electrical signals of an arbitrary low frequency so as to maintain a bias voltage; a phase delayer 22 for delaying the phase of the pilot signals by shifting their phase by 180 degrees after their generation by the pilot signal generator 21; a linear optical modulator 23 for receiving the phase-delayed signals from the phase delayer and for receiving optical signals from an external optical source to linearly modulate them so as to provide only a linear component; a signal adder 24 for adding together data signals as the main signals and the pilot signals from the pilot signal generator 21; an optical intensity modulator 25 for receiving negatively fed-back signals to adjust the bias voltage, and for receiving the added signals from the signal adder and the linearly modulated signals from the linear optical modulator 23 to modulate the optical intensity; a photo detector 26 for detecting output signals of the optical intensity modulator 25 to convert them to electrical signals; and a negative feedback circuit 27 for receiving the electrical signals from the photo detector 26 and the pilot signals from the pilot signal generator 21 to measure the amplitude of second harmonic frequency component by using a phase detector or a multiplier so as to generate negatively fed-back signals and so as to transfer them to the optical intensity modulator 25.

The optical intensity modulating apparatus using the linear optical modulator according to the present invention will be described in more detail.

When pilot signals of mo sin (2Pifot) are supplied to the optical intensity modulator, the optical output intensity I which is detected by the photo detector 26 is as follows:

$$I = (Io)/2 \,[1 + \cos\{Phio + mo\,\sin(2Pifot)\}] \quad \text{<Formula 1>}$$

where Io is the maximum optical intensity of the optical intensity modulator, Phio is the phase difference, mo (<1) is the amplitude of the pilot signals, and fo is the frequency of the pilot signals. The intensities of the detected optical outputs for the different frequencies can be expressed by Formulas 2 to 5 as follows:

dc component: $(Io)/2 \,[1 + Jo(mo)\cos(Phio)]$      <Formula 2> fo component: $(Io)/2 \cdot 2 \sin(Phio) \, J1(mo)\sin(2Pifot)$      <Formula 3>

2fo component: $(Io)/2 \cdot 2 \cos(Phio) \, J2(mo)\cos(4Pifot)$      <Formula 4>

3fo component: $(Io)/2 \cdot 2 \sin(Phio) \, J3 \sin(6Pifot)$      <Formula 5>

4fo component, 5fo component, . . .

In the magnitude of the dc component, when the value of phio becomes 90 degrees, the average output value becomes Io/2, and therefore, the extinction ratio of the ON/OFF signals can be made maximal. Meanwhile, when the phase difference is 90 degrees, the magnitude of the fo component becomes maximal, while the magnitude of the 2fo component becomes 0.

Accordingly, in adjusting the bias voltage, the method of maximizing the value of the fo component makes the signal processing very complicated, and therefore, it is not used, but the method of adjusting the value of the 2fo component to 0 is generally used. In the pilot signals, the value of mo is very much smaller than 1, and therefore, they have a large value compared with the other components. Accordingly, in the bias voltage adjusting method using the pilot signals, the value of the fo component is largest, and it produces the greatest amount of errors in transmitting the signals. That is, if the fo component is removed from the beams which are modulated by the optical intensity modulator 25, then the greater part of errors can be suppressed. Thus in the present invention, the optical signals which are inputted into the optical intensity modulator 25 are modulated to the frequency fo in a direction opposite to the modulation direction of the optical intensity modulator 25, and thus, the errors due to the pilot signals can be inhibited. The beams which are inputted into the optical intensity modulator 25 are deprived of the of component. Therefore, a linear optical modulator 23 is installed at the input terminal of the optical intensity modulator 25, and then, the pilot signals are supplied. Under this condition, if signals which have been delayed by 180 degrees relative to the pilot signals for the optical intensity modulator 25 are supplied to the linear optical modulator 23, then the fo component which causes the errors to the greatest degree is removed while maintaining the 2fo component intact. In this context, the phase delay is carried out by the phase delayer 22.

Now the present invention will be described as to its operating method.

First, the pilot signals which are transferred from the pilot signal generator 21 are phase-shifted by 180 degrees by the phase delayer 22. Under this condition, the output signals of the phase delayer 22 have the minimum value when the pilot signals have the maximum value, and vice versa (that is, they act to offset the pilot signals which are supplied to the optical intensity modulator).

Then the optical signals which are inputted from an external source are inputted into the input terminal of the linear optical modulator 23, and the electrical signals which are outputted from the phase delayer 22 are supplied to the linear optical modulator 23 also. Under this condition, the signals which are outputted from the linear optical modulator 23 include only the dc and fo components. That is, they are linearly modulated signals which are linearly proportional to the electrical signals.

Thereafter, the linearly modulated optical signals which are outputted from the linear optical modulator 23 are inputted into the optical intensity modulator 25, and then, the added signals which are formed by adding together the main signals (to be transmitted) and the electrical signals (which are transferred through the pilot signal generator 21 to adjust the bias voltage) are supplied to the optical intensity modulator 25.

Under this condition, the optical signals which are outputted from the optical intensity modulator 25 are those which have been intensity-modulated by the pilot signals and the main signals.

These optical signals have been deprived of the fo component by the linear optical modulator 23, and therefore, include only the dc 2fo, 3fo, . . . components owing to the main signals and the pilot signals component fo.

Meanwhile, a part of the optical signals which are outputted from the optical intensity modulator 25 are partly split into the monitoring signals to be transferred to the photo detector 26 by which the monitoring signals are converted into electrical signals. Under this condition, signals which are same as those outputted from the optical intensity modulator 25 are transferred to the photo detector 26, but their intensity is different.

Thereafter, the negative feedback circuit 27 measures the magnitude of the 2fo component by utilizing the 2fo component of the pilot signals and the electrical signals (dc, 2fo, . . . , and data signals) which are outputted from the photo detector 26.

The negative feedback circuit 27 includes a phase detector or a multiplier. If the 2fo component which has been measured by the negative feedback circuit 27 is not 0, then the bias voltage is varied until the value of the 2fo component becomes 0.

Figure 1:
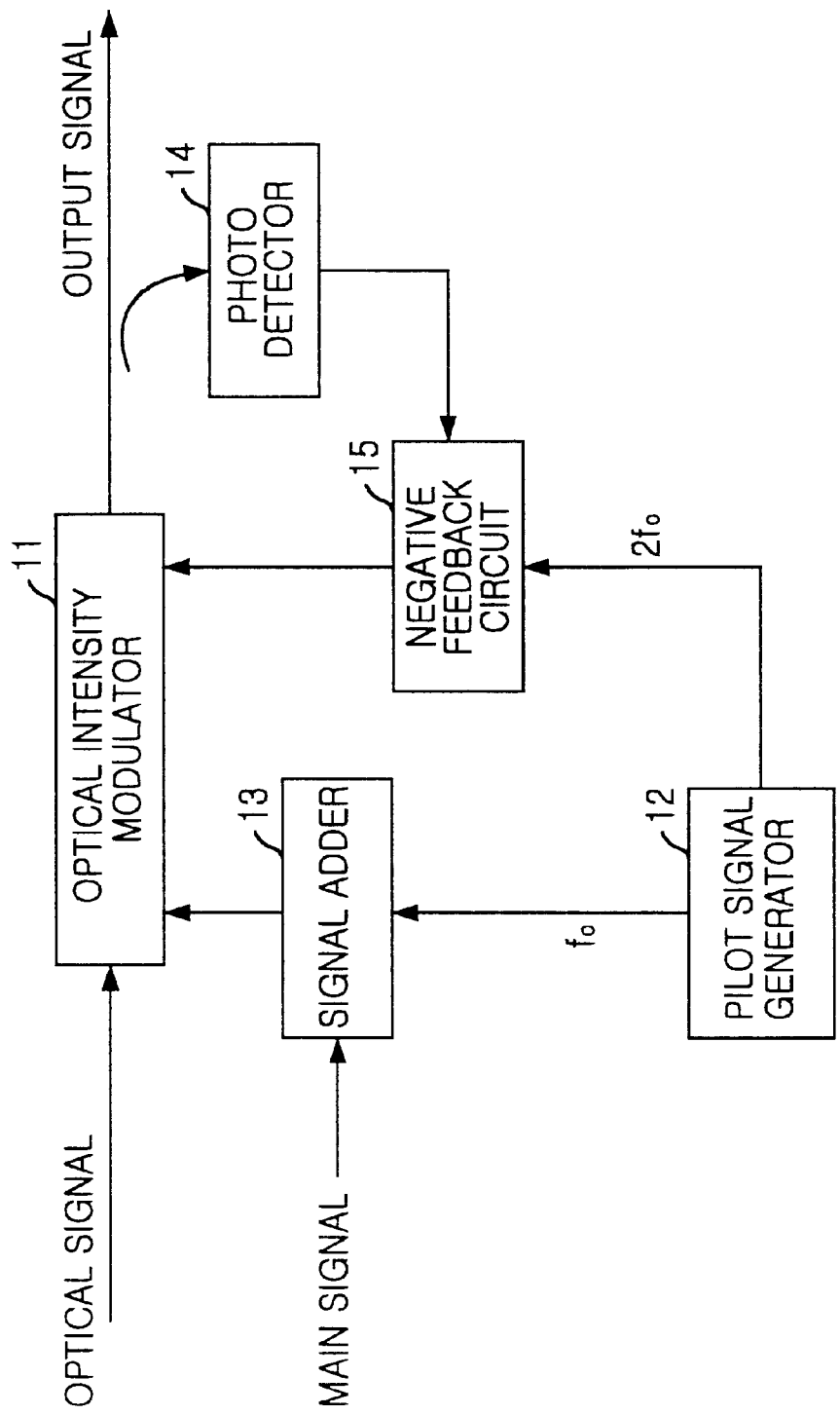
FIG. 1 illustrates the conventional optical intensity modulator using the pilot signals.

Accordingly, the optical signals which are outputted from the optical intensity modulator 25 includes the dc, 2fo and data signal components, and does not include the fo component as the noise except the 2fo, 3fo . . . components. That is, in FIG. 1, the fo component is very much larger than the 2fo, 3fo, . . . components, and therefore, the noise in the optical signals of the optical intensity modulator 25 is reduced to the utmost degree.

Figure 3:
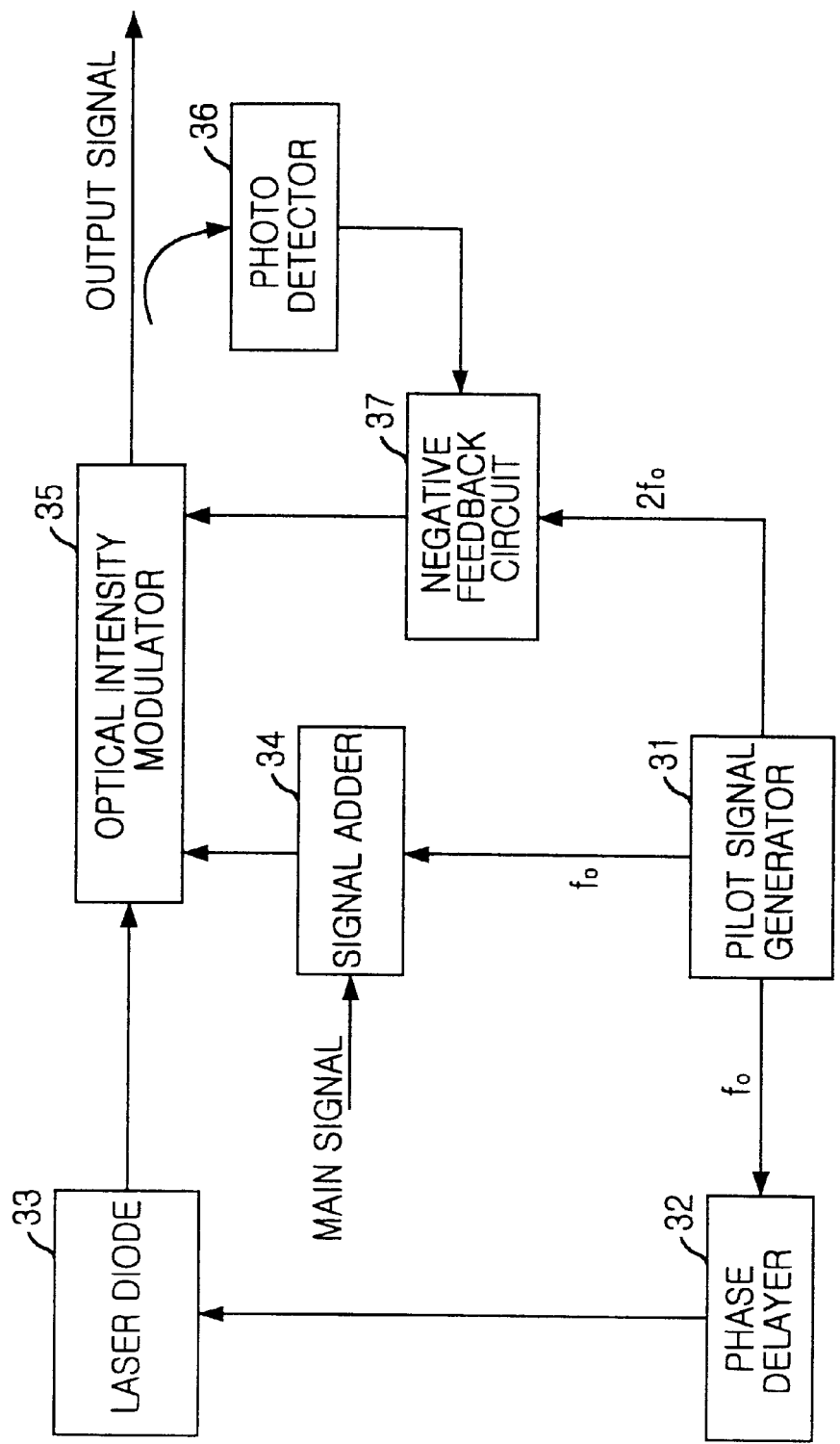
FIG. 3 illustrates another preferred embodiment of the apparatus and method for modulating the optical intensity with the noise suppressed by using a laser diode of the linear optical modulator according to the present invention.

FIG. 3 illustrates another preferred embodiment of the apparatus and method for modulating the optical intensity with the noise suppressed by using a laser diode of the linear optical modulator according to the present invention. That is, the noises are inhibited through a direct modulation by a laser diode 33 which is the optical source.

The optical output strength P of the laser diode 33 is linearly proportional to the supplied current so as to output only the fo component as shown in Formula 6:

$$P=(I-Ith)*A=(Io+I1\sin(2Pifot)-Ith*A \qquad \text{<Formula 6>}$$

where Ith is the threshold current value, and A is the proportionality coefficient. If I1 is 0, then non-modulated beams are outputted, and therefore, they are used as the input optical signals in FIGS. 1 and 2.

Meanwhile, if I1 sin(2Pifot) signals are supplied, then linearly modulated optical signals are outputted, and therefore, they have two functions as input signals and as a linear optical modulating device. Accordingly, if the pilot signals are supplied to the laser diode 33, then the functions as shown in FIG. 2 can be obtained. That is, the input optical signals which have been linearly modulated by the laser diode are same as those of FIG. 2.

Now the optical intensity modulating method of the present invention in which the noises are suppressed by using the laser diode will be described in detail.

As shown in FIG. 3, the laser diode 33 shows a linear variation in the current or voltage. Therefore, if a modulation is carried out on the frequency of fo, then 2fo or higher frequency components are not produced. Therefore, only the fo component can be eliminated by phase-delaying the pilot signals by 180 degrees, thereby making it possible to improve the data transmission quality.

In this method, in adjusting the bias voltage of the optical intensity modulator 35 by using the pilot signals, the frequency component which acts as the greatest noise can be suppressed without varying the magnitude of the useful frequency, thereby making it possible to reduce the transmission errors.

Further, far larger pilot signals can be used, and therefore, the bias voltage can be more precisely adjusted.

In the above, the present invention was described based on the specific embodiments and the attached drawings, but it should be apparent to those ordinarily skilled in the art that various changes and modifications can be added without departing from the spirit and scope of the present invention which will be defined in the appended claims.

According to the present invention as described above, the bias voltage of the optical intensity modulator is adjusted by using the pilot signals, and the inputted optical intensity is adjusted by using a linear optical modulator, so that the error-inducing signal components are offset while maintaining the signal component for adjusting the bias voltage intact, thereby suppressing the amplitude noises caused by the pilot signals.

Further, in the present invention, the bias voltage of the optical intensity modulator can be precisely adjusted, and therefore, the influence of the noise due to the pilot signals is diminished. Accordingly, the present invention can be usefully applied not only to the optical communication system but also to the optical measuring field.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for modulating an optical intensity, with amplitude noises suppressed by using a linear optical modulator, comprising:

a pilot signal generating means for generating pilot signals so as to adjust a bias voltage;

a phase delaying means for delaying a phase of the pilot signals after their generation by said pilot signal generating means;

a linear optical modulating means for receiving the phase-delayed signals and from said phase delaying means and for receiving optical signals from an external source to linearly modulate the phase delayed signals and the optical signals;

a signal adding means for adding together data signals (from an external source) and the pilot signals from said pilot signal generating means;

an optical intensity modulating means for receiving negatively fed-back signals to adjust the bias voltage, and for receiving the added signals from said signal adding means and the linearly modulated signals from said linear optical modulating means to modulate the optical intensity;

a photo detecting means for detecting output signals of said optical intensity modulating means to convert them to electrical signals;

a frequency component amplitude measuring means for receiving the electrical signals from said photo detecting means and the pilot signal generating means to measure an amplitude of a frequency component so as to generate negatively fed-back signals and so as to transfer them to said optical intensity modulating means; and a linear optical device for receiving the phase-delayed signals from said phase delaying means and for offsetting an error inducing signal, wherein the linear optical device includes a laser diode.

2. The apparatus as claimed in claim 1, wherein said phase delaying means shifts a phase of output signals of said pilot signal generating means by 180 degrees so as to output minimum signals when the phase-delayed pilot signals are maximal, and so as to output maximum signals when the phase-delayed pilot signals are minimal.

3. The apparatus as claimed in claim 1, wherein said linear optical modulating means offsets an error-inducing signal component while maintaining the signal components needed for adjusting the bias voltage intact.

4. A method for modulating an optical intensity, with amplitude noises suppressed by using a linear optical modulator, comprising the steps of:

generating a pilot signal in order to adjust a bias voltage and applying an added signal to an optical intensity modulator, the added signals having been formed by combining a data signals and the pilot signals (first step); measuring an amplitude of a second harmonic frequency component from partly detected signals from among an output signal and measured electrical signals to transfer negatively feed-back signals to an optical intensity modulator, the electrical signals having been converted from partly detected signals from among output signals and then adjusting the bias voltage (second step); and delaying the phase of the pilot signals, modulating the optical signals from an external source and the phase-delayed pilot signals to thereby provide one or more signals having a linear component and suppressing an amplitude of a noise (third step).

5. The method as claimed in claim 4, wherein suppressing the amplitude of the noise is performed by a linear optical device including a laser diode.

6. The method as claimed in claim 5, wherein at the third step, the phase of the pilot signals is shifted by 180 degrees so as to output minimal signals when the phase-delayed pilot signals are maximal, and so as to output maximal signals when the phase-delayed pilot signals are minimal.

7. The method as claimed in claim 5, wherein at the third step, a linear optical modulation is carried out to offset an error-inducing signal component while maintaining intact the signal components needed for adjusting the bias voltage.

* * * * *